United States Patent [19]

Fisher et al.

[11] Patent Number: 4,915,493
[45] Date of Patent: Apr. 10, 1990

[54] AUTOMOTIVE REAR VIEW MIRROR ASSEMBLY

[75] Inventors: Robert J. Fisher; Donald S. Rawlings, both of Livonia, Mich.

[73] Assignee: Magna International Inc., Markham, Canada

[21] Appl. No.: 293,459

[22] Filed: Jan. 4, 1989

[51] Int. Cl.[4] .......................... G02B 7/18; G05G 7/02
[52] U.S. Cl. .................................................. 350/634
[58] Field of Search .............. 350/634, 633, 636, 637; 403/90, 124

[56] References Cited

U.S. PATENT DOCUMENTS

| | | |
|---|---|---|
| 4,482,211 | 11/1984 | Fisher . |
| 4,498,738 | 2/1985 | Kumai . |
| 4,555,166 | 11/1985 | Enomoto . |
| 4,585,200 | 4/1986 | Fisher . |
| 4,678,295 | 7/1987 | Fisher . |
| 4,693,571 | 9/1987 | Kimura et al. . |
| 4,696,555 | 9/1987 | Enomoto . |
| 4,740,068 | 4/1988 | Fisher . |
| 4,818,090 | 4/1989 | Righi .................................. 350/634 |

Primary Examiner—Bruce Y. Arnold
Assistant Examiner—Tho Van Tran
Attorney, Agent, or Firm—Cushman, Darby & Cushman

[57] ABSTRACT

An automotive vehicle rearview mirror assembly comprising a plastic mirror holding member and a plastic support member provided with cooperating integral connecting structures providing for relative pivotal movements about two perpendicular intersecting axes. The connecting structures having a snap-in relation providing large interengaging dual parallel truncated spherical surfaces and smaller interengaging segmental spherical surfaces all having a common centerpoint. The support member connects with a cooperating casing member to form a casing assembly carrying a remotely controlled power operated mechanism for effecting pivotal movements of the mirror holding member. A sensing mechanism is also carried within the casing assembly for enabling the power operated mechanism to be automatically controlled as well as manually controlled. The power operated mechanism includes actuator assemblies each having a pair of actuator members one of which has a snap-in ball and socket connection with the casing member and a lug and notch connection with an associated pinion member. The sensing mechanism includes integral wall portions on the casing member for mounting two spaced sensing members with electrical contacts in cooperating relation with two potentiometer circuits on a single electrical circuit board.

32 Claims, 3 Drawing Sheets

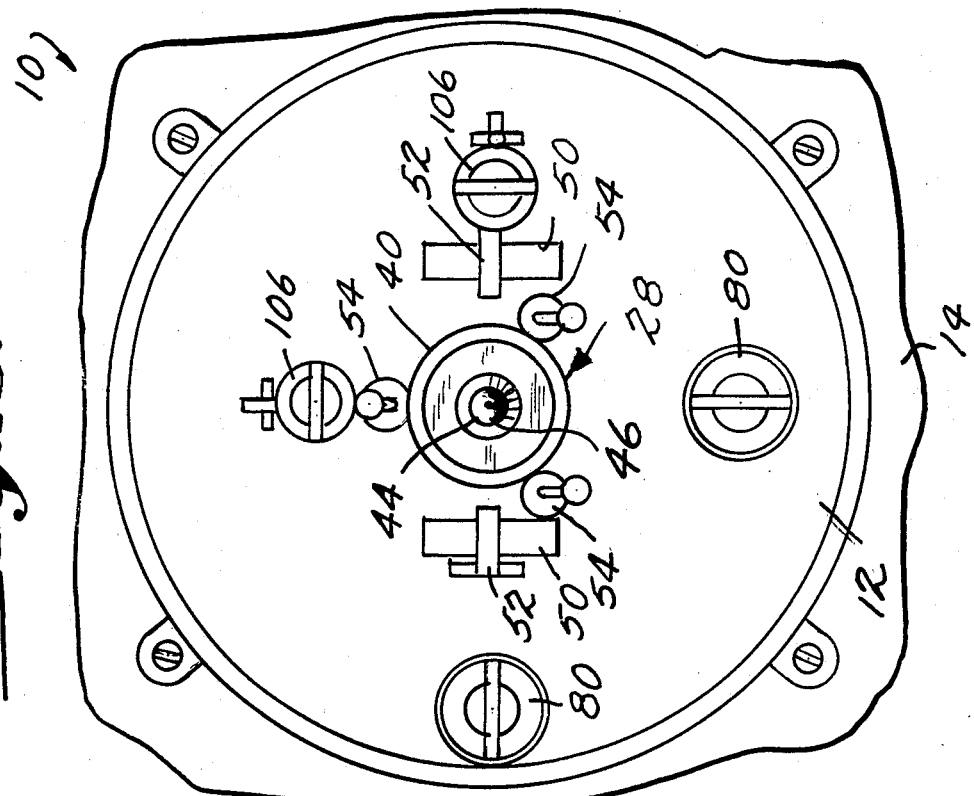
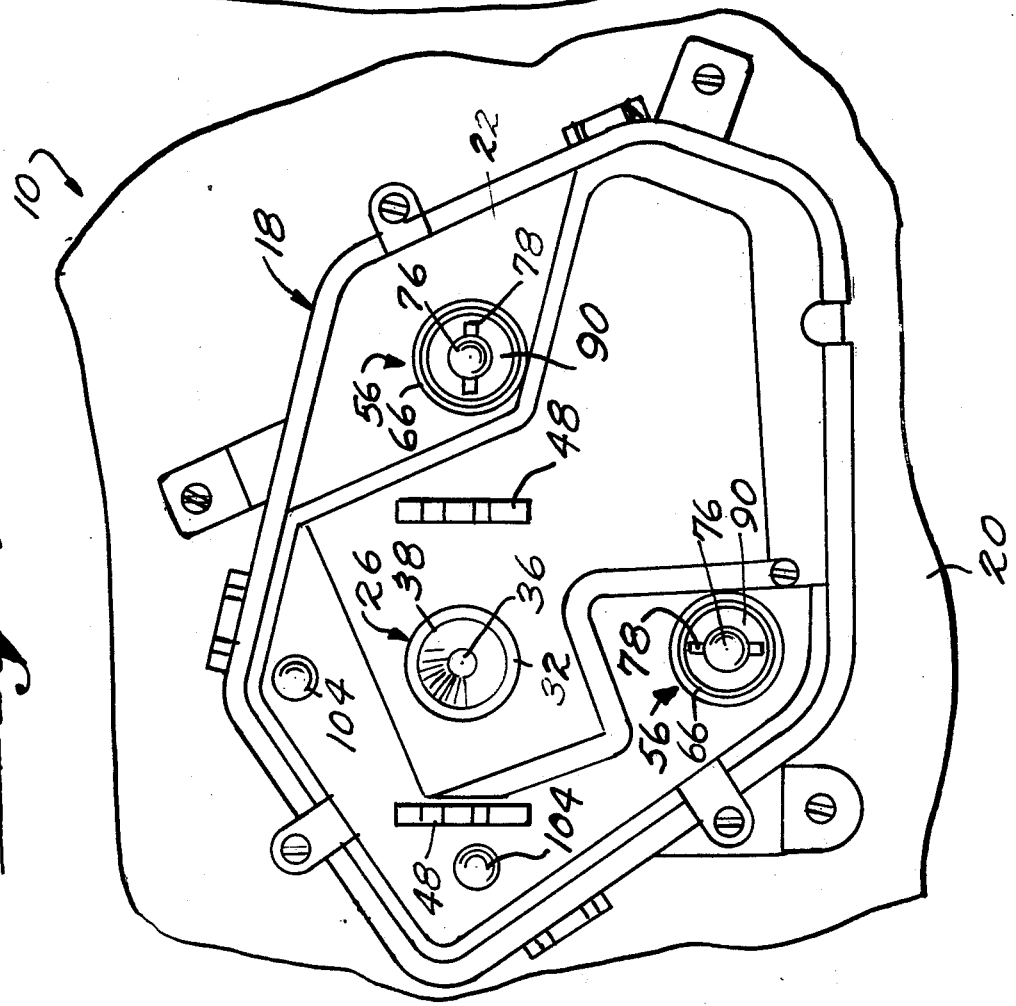

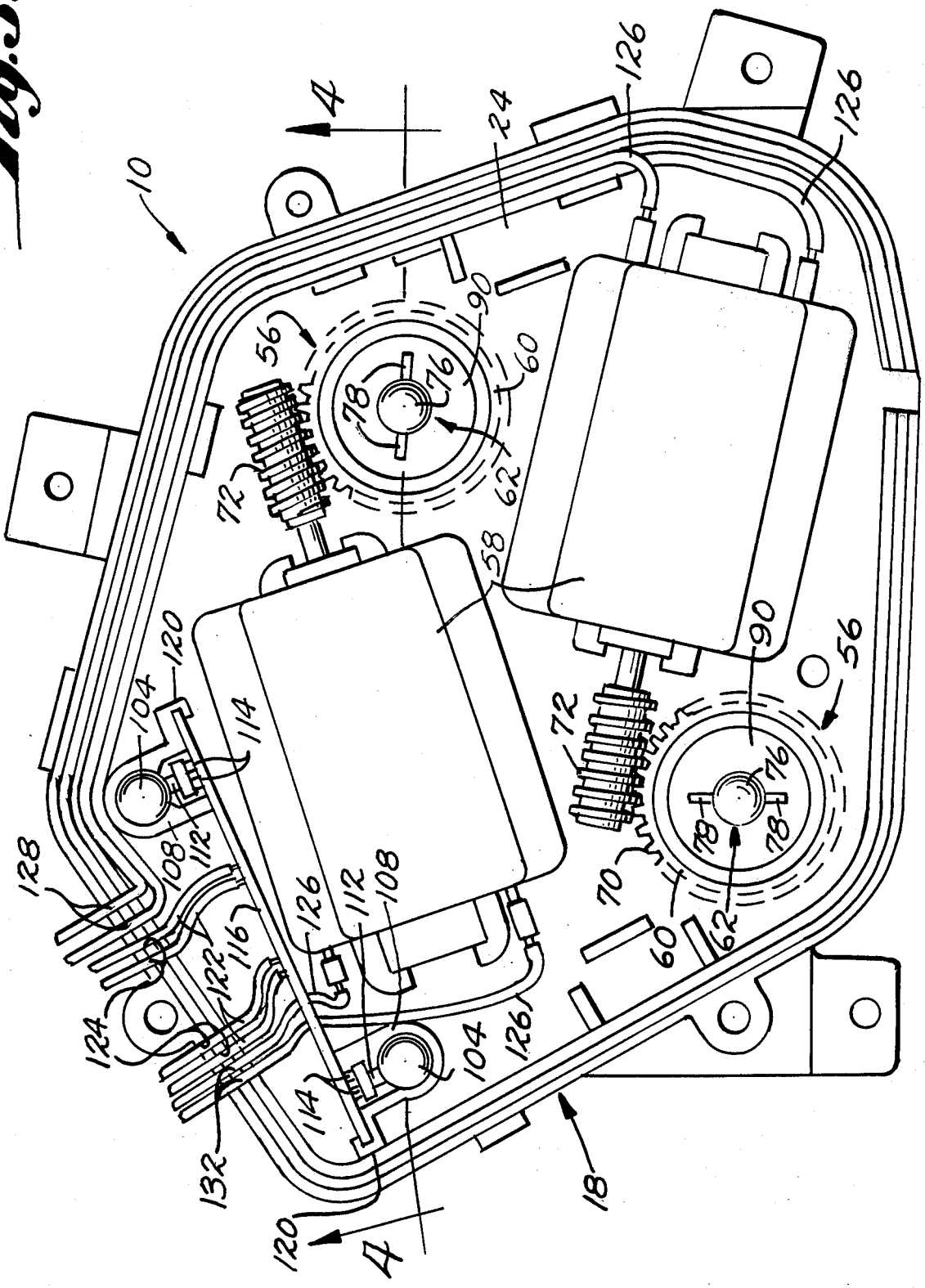

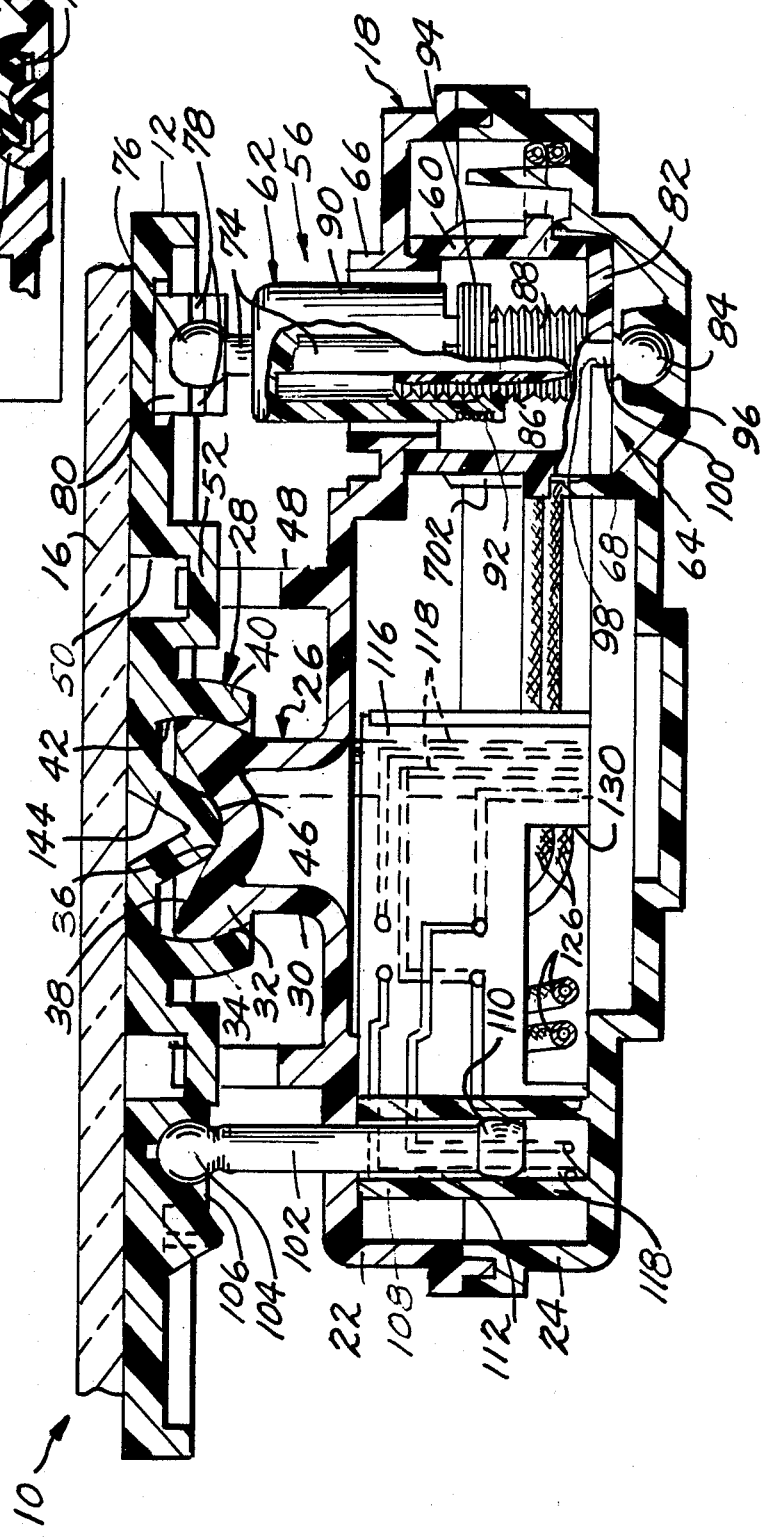

AUTOMOTIVE REAR VIEW MIRROR ASSEMBLY

This invention relates to rearview mirrors and more particularly to improvements in rearview mirrors of the type embodied in automotive vehicles.

Current examples of the type of rearview mirror embodied in an automotive vehicle therein contemplated are disclosed in U.S. Pat. Nos. 4,482,211, 4,678,295 and 4,740,068. The rearview mirror assembly disclosed in U.S. Pat. No. 4,678,295 includes a mirror holding member and a support member, both of which are molded of plastic material. The support member forms a part of a two-piece housing or casing assembly which is fixed to the fixed support on the vehicle and the mirror holding member carries the mirror itself. The mirror holding member is mounted on the support member for pivotal movements along two intersecting perpendicular axes. The housing assembly contains remotely controlled power operated mechanisms for effecting the pivotal movements of the mirror holding member along the two intersecting perpendicular axes with respect to the support member. The housing assembly also contains sensor assemblies for enabling the power operated mechanisms to effect pivotal movements of the mirror holding member into positions determined by computer memory.

One aspect of the present invention is particularly concerned with the construction of the pivotal connection between the mirror holding member and the support member and, hence, is applicable not only to mirror assemblies in which the movements are effected by remotely controlled power operated mechanisms but remotely controlled manually operated mechanisms such as three Bowden wire assemblies and even has applicability to mirror assemblies in which the pivotal movements of the mirror holding member with respect to the support member are accomplished by direct manual engagement of the mirror holding member.

The pivotal connections provided in the mirror assemblies disclosed in U.S. Pat. Nos. 4,482,211, 4,678,295, and 4,740,068 are in the form of a snap-in ball and socket configuration. It will be understood that a snap-in ball and socket connection constitutes the simplest form of connection which can be provided. It is easily assembled and self-restraining. This form of connection, however, does have its limitations. First, the ball element must be fixed to one of the members through a base portion which intersects with the ball along a truncation thereof. The diameter of the periphery of the truncation represents a limitation on the fracturing strength of the ball element. A further problem exists in that this dimension cannot be simply increased to whatever desired dimension is necessary to provide the necessary strength because the increase may increase the axial dimension of the connection to a point where the mirror holding member is spaced from the support member more than is desirable and because the amount of plastic material required to form the ball may result in deformation during cooling following the injection molding step sufficient to distort the accuracy of the interconnecting spherical surfaces. These difficulties are obviated by providing a three-piece connection such as disclosed above in U.S. Pat. No. 4,585,200. Another construction which has been utilized which avoids the above-described problems is essentially a four-piece connection which includes a hemispherical socket on one of the members, a separate shell-like hemispherical element engaged with the socket, and a two-piece spring arrangement for resiliently urging the two elements together. Examples of this type of connection are illustrated in U.S. Pat. Nos. 4,555,166, 4,696,555, and 4,693,571. An advantage of this type of connection is that the socket can be made to be quite large since the ball engaging within the socket is of separate shell-like configuration. The disadvantage of these multiple part connections which avoid the advantage of a simple ball and socket connection is, of course, their cost by virtue of the need to provide separate elements which materially increases the cost not only in terms of the cost required to provide the extra parts but in the added difficulty in assembly. That is, assembly requires many more procedural steps than the simple snap together action of an integral ball and socket connection.

An object of the present invention is the provision of a mirror assembly having a pivotal connection between the mirror holding member and the support member which achieves the advantages of the prior art type connections as discussed above while eliminating the disadvantages thereof. In accordance with the principles of the present invention, this objective is obtained by providing cooperating first and second connecting structures formed integrally on the plastic support member and the plastic mirror holding member respectively which have the following construction. The first connecting structure includes a projecting base portion having an enlarged portion on a projecting end of the base portion, the enlarged portion having a first convex connecting surface disposed within a spherical plane having a first pair of parallel truncations one of which is defined by an intersection with the base portion. The enlarged portion has a first concave connecting surface facing away from the base portion disposed within a first spherical segmental plane having (1) a center coincident with the center of the first spherical plane and (2) a radius smaller than the radius of the first spherical plane. The second connecting structure comprises a projecting annular wall having a second concave connecting surface disposed within a second spherical plane having (1) a radius generally equal to the radius of the first spherical plane and (2) a second pair of parallel truncations. The second connecting structure also includes a projecting central portion within the annular wall having a second convex connecting surface facing in the direction of projection of the annular wall disposed within a second spherical segmental plane having (1) a center coincident with the center of the second truncated spherical plane and (2) a radius equal to the radius of the first spherical segmental plane. The nature of the plastic material and construction of the annular wall are such that the annular wall is operable in response to the movement of the enlarged portion therein to resiliently yield and resiliently return to bring the first convex connecting surface of the enlarged portion into engagement with the second concave connecting surface of the annular wall so as to retain the first and second integral connecting structures against movement in a direction away from one another and said first concave connecting surface of the enlarged portion into engagement with the second convex connecting surface of the projecting central portion so as to limit the movement of the first and second integral connecting structures in a direction toward one another. The engagement of the connecting surfaces permits relative sliding movement therebetween so as to retain the members in cooperating relation in a multiplicity of different positions of pivotal movement of the mirror holding member with respect to the support member along the two intersecting perpendicular axes. Since the invention involves a snap-in connection provided by integral connecting structures, the advantages of the conventional prior art ball and socket connection are retained, while at the same time, the inherent limitations thereof are eliminated. Thus, an increase in the size of the truncation between the base portion and the enlarged portion integral therewith does not increase the axial extent of the connection in a twofold manner as in the past nor does it result in a corresponding increase in the wall size of the enlarged portion of the first connecting structure.

A second aspect of the present invention is particularly concerned with the remotely controlled power operated mechanisms for effecting the movements of the mirror holding member with respect to the support member. A typical mechanism of this type includes an actuator carried by the housing assembly selectively driven by an electric motor. The present invention is concerned with improvements in the type of actuator assembly shown in U.S. Pat. No. 4,498,738. The actuator assembly consists essentially of first and second telescopically mounted threadedly interrelated actuator members and a hollow pinion member drivingly connected with the associated electric motor. The first actuator member is connected with the mirror holding member by a snap-in ball and socket connection. The second actuator member has a knob-type pivotal connection with the housing or casing member which does not restrain movement of the second actuator member in a longitudinal direction away from the housing member. Presumably, restraint in this direction is obtained through the driving connection between the second actuator member and the hollow pinion member. In actual practice, the tolerances generated by this three-member connection are taken up by a spring washer acting on the hollow pinion member to move it toward the second actuator member. As a result, the control of the movement of the second actuator member is not as firm and positive as desirable.

Another object of the present invention is to provide a mirror assembly of the type described having a remotely controlled power operated mirror moving mechanism of the type described including an improved actuator assembly which obviates the problems noted above. In accordance with the principles of the present invention, this objective is obtained by providing each second actuator member with an integral connecting structure on one end thereof and the casing member with an integral connecting structure having a snap-in relationship with respect to the integral connecting structure on each second actuator member operable when in such snap-in relationship to (1) permit rotational movements about the telescoping axis thereof and pivotal movements about a centerpoint on the telescoping axis thereof and (2) prevent movements in either direction along the telescoping axis thereof. In addition, integral connecting structure is provided on each pinion member and the associated second actuator member for transmitting rotational movements of the pinion member to corresponding rotational movements of the associated second actuator member about the telescoping axis thereof while accommodating pivotal movements of the associated second actuator member about the center point thereof. In this way, the prior art three member connections become simplified two member connections.

A third aspect of the present invention relates to improvements in the sensors assemblies such as provided in U.S. Pat. No. 4,678,295, as aforesaid. As disclosed in the patent, the sensor assemblies are separate from the main housing or casing assembly each consisting of a separate housing having a bore for slidably receiving the spherical enlargement on one end of the associated sensing member and a separate circuit board carried by the separate housing exposed laterally through an opening in the housing communicating laterally with the bore within which electrical contacts fixed to the associated sensing member could cooperate with a potentiometer circuit on the circuit board.

Accordingly, another object of the present invention is the provision of a mirror assembly of the type described in which the components of the sensor assembly are constructed and assembled in a more cost effective manner in accordance with the principles of the present invention this objective is obtained by providing first and second sensing members connected with the mirror holding member so that the first sensing member moves therewith only when the mirror holding member moves about one of the two intersecting axes and the second sensing member moves therewith only when the mirror holding member moves about the other of the two intersecting axes. The casing member has spaced first and second integral structures for mounting opposite end portions of the first and second sensing members for generally longitudinal movements corresponding to the movements of the ends thereof with the mirror holding member. A single electrical circuit board is provided having first and second potentiometer circuits thereon. First and second electrical contacts are carried by the opposite end portions of the first and second sensing members respectively for movements therewith. The single electrical circuit board is mounted in the casing member so that the first and second electrical contacts cooperate with the first and second potentiometer circuits on the single electrical circuit board.

Another object of the present invention is the provision of a mirror assembly of the type described which is simple in construction, effective in operation and cost effective in manufacture.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is a fragmentary front elevational view of a mirror assembly embodying the principles of the present invention with the mirror glass and mirror holding member of the assembly removed;

FIG. 2 is a fragmentary rear elevational view of the removed mirror holding member and mirror glass;

FIG. 3 is a front elevational view of the casing assembly with the support member of the casing assembly removed;

FIG. 4 is a sectional view taken along the line 4—4 of FIG. 3, with the actuator assembly shown in broken elevation and the electric motors removed; and FIG. 5 is a fragmentary sectional view showing a modified connection between the second actuator member and the casing member of the mirror assembly.

Referring now more particularly to the drawings, there is shown therein a rearview mirror assembly, generally indicated at 10, embodying the principles of the present invention. The mirror assembly 10 includes a mirror case which consists of a central mirror holding member 12 and a peripheral mirror holding member 14, fragmentarily shown in FIG. 2. A glass mirror 16, fragmentarily shown in FIG. 4, is carried by the mirror case on one side thereof. The opposite side of the mirror holding member 12 is connected with a casing assembly, generally indicated at 18, which, in turn, is connected with a support structure 20 which is fragmentarily shown in FIG. 1. The support structure 20 may be of any conventional construction provided in the exterior sides of the vehicle or the central interior thereof.

The casing assembly 18 is preferably of two-piece construction including a support member 22 and a casing member 24. The support member 22 includes an integral connecting structure, generally indicated at 26, which is adapted to cooperate with an integral connecting structure, generally indicated at 28, formed on the side of the mirror holding member 12 opposite from the mirror side thereof in generally concentric relation thereto. The construction of the two integral connecting structures 26 and 28 is an important feature of the present invention. The connecting structures 26 and 28 are of the snap-in type and are adapted to establish a pivotal interconnection between the support member 22 and the mirror holding member 12 which provides for pivotal movement about two intersecting perpendicular axis.

As shown, the integral connecting structure 26 on the support member 22 includes a projecting base portion 30 having an enlarged portion 32 on a projecting end of the base portion 30. The enlarged portion 32 has a first convex connecting surface 34 which is disposed within a first spherical plane having a first pair of truncations one of which is defined by an intersection with the base portion 30. In the embodiment shown, the surface 34 is a dual truncated spherical surface extending throughout the first dual truncated spherical plane. It will be understood that portions of the surface 34 within the plane may be omitted.

The enlarged portion 32 also has a first concave connecting surface 36 facing away from the base portion 30 which is disposed within a first spherical segmental plane having (1) a center coincident with the center of the first truncated spherical plane and (2) a radius smaller than the radius of the first truncated spherical plane. As before, surface 36 is a segmental spherical surface extending throughout the plane. Portions may be omitted however. An annular wall surface 38 which preferably is conical extends from the spherical segmental surface 36 to the truncated spherical surface 34 in outwardly diverging relation.

The integral connecting structure 28 on the mirror holding member 12 comprises a projecting annular wall 40 having a second concave connecting surface 42 disposed within a second spherical plane having (1) a radius generally equal to the radius of the first spherical plane and (2) a second pair of parallel truncations. Surface 42 as shown is a dual truncated spherical surface extending throughout the second dual truncated spherical plane although portions thereof may be omitted.

The integral connecting structure 28 also includes a projecting central portion 44 within the annular wall 40 which is in the form of a cone having its apex formed with a second convex connecting surface 46 facing in the direction of the projection of the annular wall disposed within a second spherical segmental plane having (1) a center coincident with the center of the second truncated spherical plane and (2) a radius equal to the radius of the first spherical plane segmental plane. Surface 46, as shown, is a spherical segmental surface extending throughout the second spherical segmental plane although portions thereof may be omitted.

It will be noted that both the casing member 24 and support member 22 of the casing assembly are molded of plastic material and that similarly the mirror holding members 12 and 14 are molded of plastic materials as well. The nature of the plastic material utilized, as, for example, Delrin ® or the like, and the construction of the annular wall 40 is such that the annular wall is operable in response to the movement of the enlarged portion 32 therein to resiliently yield and resiliently return to bring the first convex connecting surface 34 of the enlarged portion 32 into engagement with the second concave connecting surface 42 of the annular wall 40 so as to retain the first and second integral connecting structures 26 and 28 against movement in a direction away from one another and the first concave connecting surface 36 of the enlarged portion 32 into engagement with the second concave connecting surface 46 of the projecting central portion 44 so as to limit the movements of the first and second connecting structures 26 and 28 in a direction toward one another. The engagement of the connecting surfaces permits relative sliding movement therebetween so as to retain the members in cooperating relation in a multiplicity of different positions of pivotal movement of the mirror holding member with respect to the support member along the aforesaid two intersecting perpendicular axes. It will be noted that such pivotal movements are limited by the extent of the truncated surfaces 34 and 42 and that the differences in the angles of divergence of the conical surface of the portion 46 with respect to the conical surface 38 of the portion 32 accommodate such movements.

Means is provided for preventing pivotal movements between the mirror holding member 12 and the support member 22 about a third axis which is perpendicular to and intersects the aforesaid two intersecting pivotal axes. Such means may assume any desired configuration and may be incorporated within the integral connecting structures 26 and 28, if desired. However, as shown, a separate means is preferred. Extending upwardly from the exterior of the support member 22 on opposite sides of the connecting structure 26 thereof is a pair of upstanding integral bifurcated motion restricting elements 48. The mirror holding member 12 is formed with a pair of parallel openings 50 for receiving the bifurcated elements 48 and extending across each opening 50 is an integral shaft or pin-like section 52, the pin-like sections 52 having a common coincidental axis which passes through the pivotal axis of the connecting structures. In this way, the interengagement of one of the pin sections 52 at all times within one of the bifurcated elements 48 serves to prevent pivotal movements between the mirror holding member and the support member about a third axis which is perpendicular and intersects the two intersecting perpendicular axes of pivotal movement.

There is shown in FIG. 2 three integral structures 54 operable to receive the ends of three Bowden wires (not shown). In certain embodiments of the invention, the mirror holding member 12 may be adjusted by means of such Bowden wires connected to the aforesaid three structures 54. For present purposes however movement of the mirror holding member 12 about the two intersecting pivotal axes is accomplished by a remotely controlled power operated system carried within the casing assembly. Basically, the system includes two power driven actuator assemblies, generally indicated at 56, and two electrical motors 58 for driving the actuator assemblies.

Referring now more particularly to FIG. 4, each actuator assembly 56 consists essentially of three components, one, a hollow cylindrically shaped pinion member 60 and first and second telescoping actuator members, generally indicated at 62 and 64. Each pinion member 60 is mounted within the casing assembly 18 for rotational movement about a fixed axis. As shown, this mounting includes a bearing surface within the interior of the upper end of the pinion member 60 by an integral cylindrical wall 66 in the support member 22 defining an opening through which the associated first actuator member 62 extends outwardly of the casing assembly 18 for connection with the mirror holding member 12. The rotational mounting of each pinion member 60 also includes the engagement of an exterior annular flange extending from its central portion with a suitable upstanding annular wall 68 integrally formed in the casing member 24. Suitable gear teeth 70 are formed on the exterior central portion of each pinion member 60. A worm 72 is disposed in meshing engagement with each set of gear teeth 70, each worm 72 being connected to the output shaft of an associated electric motor 58.

Each electric motor 58 is suitably fixed within the casing assembly 18 by engagement within suitable wells formed integrally in both the support member 22 and the casing member 24.

Each of the first actuator members 62 is in the form of an elongated rod 74 having a ball element 76 fixed to one end thereof. Each ball element 76 has a pair of stub shaft elements 78 extending therefrom in axially aligned and diametrically opposed relation. The mirror holding member 12 has a pair of socket structures 80 formed integrally therewith.

As shown, each of the socket structures 80 is of split construction, unlike the integral construction of the annular wall 40 of the connecting structure 28. In this regard, it will be understood that the annular wall 40 may be of split construction if desired. The split construction is required in connection with a ball element 76 of the type having stub shafts 78 extending therefrom. With this arrangement, each ball element 76 when in snapped-in relation with the associated socket structure 80 permits pivotal movement of the associated first actuator member 62 about two intersecting perpendicular axes, the stub shafts 78 preventing pivotal movement about a third axis which is perpendicular and intersects the other two.

It will be noted that the pivot point of one of the ball element 76 of one of the first actuator members 62 within its associated socket structure 80 is coincident with one of the two pivotal axes of the connecting structures 26 and 28 and is spaced in parallel relation with respect to the other. Similarly, the other ball element has its center coincident with the other axis and spaced from the one axis. In this way, the two first actuator members 62 are connected to the mirror holding member 12 so that one will only move with the mirror holding member when the latter moves about one of the axes thereof and the other is mounted so as to move with the mirror holding member only when the mirror holding member moves about the other of the two axes provided.

Each second actuator member 64 is formed to include a disk shaped portion 82 having a ball portion 84 formed integrally on one side thereof in concentric relation and a cylindrical wall portion 86 extending from the opposite side thereof in concentric relation. The hollow interior of the cylindrical wall portion 86 telescopically receives the opposite end portion of the rod 74 of the associated first actuating member 62 so that the two members are movable in a telescopic relationship with respect to one another along a longitudinally extending telescoping axis.

The exterior periphery of the central wall portion 86 of each second actuator member 64 is formed with exterior threads 88. Each associated first actuator member 60 includes an integral cup-shaped portion 90 which is concentric with the central portion thereof. Each cup-shaped portion 90 has a series (three) of annularly spaced arm portions 92 extending therefrom. The free ends of the arm portions 92 are turning inwardly and are provided with interior threads which are threadedly engaged with the exterior threads of the cylindrical wall portion 86 of the associated second actuator member 64. If desired, a spring 94 may be provided in circumferentially confining relation with the arm portions 92 so as to permit simple yielding of the arms during assembly while providing more rigidity during operation and at the same time still permit yielding at the extremities of the intermeshing engagement of the threads 88.

In accordance with the principles of the present invention, the ball element 84 of each second actuator member 64 cooperates with a snap-in socket portion 96 formed integrally on the casing member 24. Each snap-in ball and socket connection 84-96 permits the associated second actuator member 64 to pivot about the center point of the ball element 84 but prevents translational movement of the second actuator member 64 along the telescoping axis thereof. In addition to the pivotal movements provided by the engagement of each ball element 84 within the associated socket portion 96, the connection serves to mount the associated second actuator member 64 for rotational movements about the longitudinal telescoping axis thereof, which axis intersects the center point of the ball element 84.

In addition to the integral connecting elements 84 and 96 between each second actuator member 62 and the casing member 24, there is also provided integral connecting portions between each second actuator member 64 and the associated pinion member 60 which, as shown, preferably comprises a pair of annularly spaced notches 98 formed in the exterior periphery of the disk shaped portion 82 of each second actuator member 64 and a pair of lugs 100 depending from an end edge of the associated pinion member 60 shaped to engage within the notches 98. The interengagement of each pair of lugs 100 within the associated pair of notches 98 serves to transmit rotational movements of the associated pinion member 60 to corresponding rotational movements of the associated second actuator member 64 about its telescoping axis. Since the associated first actuator member 62 is prevented from turning about the telescoping axis, rotational movements of each second actuator member 64 by the associated pinion member 60 will effect longitudinal telescoping movements of the associated first actuator member 62. In this way, the actuation of the electric motors 58, which are reversible in a desired direction by remote control, serve to effect the desired movements of the mirror holding member 12 through the operation of the actuator assemblies 56.

The preferred mirror assembly 10 embodying the principles of the present invention also is provided with sensing means for sensing the position of pivotal movement of the mirror holding member 12 with respect to the support member 22 about the two intersecting axes so that the power operated means can be utilized not only to achieve movements which are controlled manually but movements which can be automatically controlled in response to the position of the sensing means. The type of sensing means utilized herein is fully disclosed in the aforesaid U.S. Pat. No. 4,678,295 the disclosure of which is hereby incorporated by reference into the present specification.

For present purposes, it is sufficient to note that the sensing means includes two sensing members 102 which are mounted for movement between the mirror holding member 12 and the casing member 24 in a manner similar to the two first actuator members 62. That is, each is mounted on the mirror holding member 12 as by a snap-in connection consisting of an integral ball portion 104 on one end of the associated sensing member 102 and a socket portion 106 integral with the mirror holding member 12. The arrangement of the socket members with respect to the two intersecting pivotal axes of the sensing members is similar to the arrangement of the socket portions in that each moves longitudinally with only one of the two associated pivotal movements about the two intersecting pivotal axes.

In accordance with the principles of the present invention, the mounting of each sensing member 102 with respect to the casing member 24 is accomplished by providing an integral upstanding wall portion 108 of C-shaped cross-sectional configuration on the casing member 24 for each of the sensing members 104. Each sensing member 102 has a generally spherical shaped enlargement 110 on the opposite end thereof which is slidably mounted within the associated C-shaped wall portion 108. As best shown in FIG. 4, each sensing member 102 includes an integral laterally projecting portion 112 which extends through the associated lateral opening in the C-shaped wall portion 108 and carries electrical contact elements 114 (FIG. 3) at the laterally outwardly facing side thereof.

In accordance with the principles of the present invention, a single electrical circuit board 116 is provided, which board 116 includes first and second potentiometer circuits 118 thereon. As shown, the single electrical circuit board 116 is slidably mounted within the casing member 24 by a pair of integral U-shaped wall portions 120 formed adjacent opposite outer ends of the C-shaped wall portions 108 respectively. Thus, the arrangement is such that the opening of one of the C-shaped wall portions 108 is toward one surface of the electrical circuit board while the other C-shaped wall portion opens to the opposite side of the electrical circuit board. Also, it will be noted that the potentiometer circuits 118 are provided on opposite sides of the circuit board for cooperation with the electrical contact elements 114 of the associated sensing members 102.

The circuit board 116 is hardwired to a plurality of electrical wires 122 which extend from the board 116 outwardly through a plurality of closely spaced notches 124 formed in an edge portion of the casing member 24 which is spaced alongside the board 116. The support member 22 has a cooperating edge portion which serves to retain the wires 122 into the notches 124 when the support member 22 and the casing member 24 are in assembled relation.

The electrical motors 58 are hardwired to include a second plurality of electrical wires 122, 126, one pair of which is positioned along the interior periphery of the casing member 24 and passes through additional notches 128 adjacent the notches 124. Similarly, a second pair of motor wires 126 extend through a recess 130 (see FIG. 4) formed in the central edge portion of the electrical circuit board 116 and then through additonal notches 132 as before. The arrangement provides for a desirable control of the hardwires extending both within the casing assembly 18 and in the immediate environment outwardly thereof. The utilization of a single circuit board 116 constitutes particularly a cost effective manner of achieving the functional characteristics of the sensing members as basically described in the aforesaid patent.

It will be understood that the construction of the integral connecting structures 26 and 28 may be utilized in lieu of any of the ball and socket joints provided. A particularly desirable location would be at the position where ball elements 84 and socket portions 96 are utilized since it will be noted that these positions constitute the most outwardly projecting portions of the casing member 24. FIG. 5 illustrates a modification of the ball and socket joint 84–96 so as to incorporate the teachings embodied in the connecting structures 26 and 28. As shown, in lieu of ball element 84 an integral connecting structure 134 having a configuration similar to the connecting structure 26 is provided in each second actuator member 64. Similarly, in lieu of the associated socket portion 96, an integral connecting structure 134 is formed in the casing member 24 having a configuration similar to the connecting structure 28.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A mirror assembly comprising
a mirror holding member molded of plastic material,
a mirror carried by said mirror holding member,
a support member molded of plastic material and
means for connecting said mirror holding member on said support member for pivotal movements along two intersecting perpendicular axes,
said connecting means comprising
cooperating first and second connecting structures formed integrally on said members respectively,
said first integral connecting structure comprising a projecting base portion having an enlarged portion on a projecting end of said base portion, said enlarged portion having first convex connecting surface means disposed within a first spherical plane having a first pair of parallel truncations one of which is defined by an intersection with said base portion,
said enlarged portion having first concave connecting surface means facing away from said base portion disposed within a first spherical segmental plane having (1) a center coincident with the center of said first spherical plane and (2) a radius smaller than the radius of first spherical plane, said second integral connecting structure comprising a projecting annular wall having second concave connecting surface means disposed within a second spherical plane having (1) a radius generally equal to the radius of said first truncated spherical plane and (2) a second pair of parallel truncations, said second integral connecting structure including a projecting central portion within said annular wall having second convex connecting surface means facing in the direction of projection of said annular wall disposed within a second spherical segmental plane having (1) a center coincident with the center of said second spherical plane and (2) a radius equal to the radius of said first spherical segmental plane, the nature of the plastic material and the construction of said annular wall being such that said annular wall is operable in response to the movement of said enlarged portion therein to resiliently yield and resiliently return to bring (1) the first convex connecting surface means of said enlarged portion into engagement with the second concave connecting surface means of said annular wall so as to retain said first and second integral connecting structures against movement in a direction away from one another and (2) said first concave connecting surface means of said enlarged portion into engagement with the second convex connecting surface means of said projecting central portion so as to limit the movement of said first and second integral connecting structures in a direction toward one another, the engagement of said connecting surface means permitting relative sliding movement therebetween so as to retain the members in cooperating relation in a multiplicity of different positions of pivotal movement of said mirror holding member with respect to said support member along said two intersecting perpendicular axes.

2. A mirror assembly as defined in claim 1 wherein said first concave connecting surface means comprises a first spherical segmental surface extending throughout said first spherical segmental plane, said first convex connecting surface means includes a first dual truncated spherical surface extending throughout said first spherical plane between the first pair of truncations thereof, said first concave connecting surface means comprises a first spherical segmental surface extending throughout said first spherical segmental plane, said first integral connecting structure including an annular surface extending from said first spherical segmental surface to said first dual truncated spherical surface in outward diverging relation.

3. A mirror assembly as defined in claim 2 wherein said projecting central portion is in the form of a cone having said second convex connecting surface means on the apex thereof, said second convex connecting surface means comprising a second spherical segmental surface extending throughout said second spherical segmental plane.

4. A mirror assembly as defined in claim 3 wherein the angle of divergence of said cone is substantially less than the angle of divergence of said outwardly diverging annular surface.

5. A mirror assembly as defined in claim 4 wherein said connecting means is further operable to prevent pivotal movements between said members about a third axis perpendicular to and intersecting said two intersecting axes, a casing member fixed to said support member and forming therewith a casing assembly, said casing assembly having power operated means mounted therein for effecting pivotal movements of said mirror holding member about said two intersecting perpendicular axes, said power operated means including a pair of power driven actuator assemblies, each of said actuator assemblies including a first actuator member having an end portion extending outwardly of said casing assembly pivotally connected to said mirror holding member and a second actuator member disposed in telescoping relation with said first actuator member along a longitudinally extending telescoping axis, each second actuator member having an integral connecting structure on one end thereof, said casing member having an integral connecting structure thereon having a snap-in relationship with respect to the integral connecting structure on each second actuator member operable when in said snap-in relationship to (1) permit rotational movements about the telescoping axis thereof and pivotal movements about a centerpoint on the telescoping axis thereof and (2) prevent movements in either direction along the telescoping axis thereof, each actuator assembly also including a hollow pinion member disposed in surrounding relation to the associated second actuator member and mounted in said casing member for power driven rotation about a fixed axis, integral means on each pinion member and the associated second actuator member for transmitting rotational movements of the pinion member to corresponding rotational movements of the associated second actuator member about the telescoping axis thereof while accommodating pivotal movements of the associated second actuator member about the center point thereof, the pivotal mounting of each first actuator member being such as to prevent rotational movements thereof about the telescoping axis thereof, and yieldable threaded means between the first and second actuator members of each actuator assembly for effecting telescopic movements of the associated first actuator member along the telescoping axis thereof with respect to the associated second actuator member in response to rotational movements of the associated second actuator member about the telescoping axis thereof.

6. A mirror assembly as defined in claim 5 wherein said integral means on each second actuator member comprises a plurality of annularly spaced notches in an exterior periphery of said disk portion and said integral means on each pinion member comprises a plurality of depending lugs on a low edge thereof fitted with said plurality of notches.

7. A mirror assembly as defined in claim 6 wherein each second actuator member includes a disk shaped portion, the integral connecting structure of each second actuator member comprising a ball portion integral with one side of the associated disk shaped portion in concentric relation therewith, each disk shaped portion having a cylindrical wall portion integral with the other side thereof in concentric relation therewith, said threaded means including exterior threads on an exterior periphery of each cylindrical wall portion.

8. A mirror assembly as defined in claim 7 wherein each first actuator member includes a shaft portion slidably telescopically mounted within the interior periphery of the cylindrical wall member of the associated second actuator member, a plurality of integral annularly spaced longitudinally extending arm portions disposed in radially outwardly spaced relation with respect to said shaft portion, said arm portions having inturned free ends, said threaded means including internal threads formed on said inturned ends threadedly engaging the exterior threads on the cylindrical wall portion of the associated second actuator member.

9. A mirror assembly as defined in claim 8 wherein said mirror holding member has first and second sensing members connected therewith so that said first sensing member moves therewith only when said mirror holding member moves about one of said two intersecting axes and said second sensing member moves therewith only when said mirror holding member moves about the other of said two intersecting axes, said casing member having spaced first and second integral structures for mounting opposite end portions of said first and second sensing members for generally longitudinal movements corresponding to the movements of the ends thereof with said mirror holding member, a single electrical circuit board having first and second potentiometer circuits thereon, first and second electrical contact means carried by the opposite end portions of said first and second sensing members respectively for movements therewith, and means for mounting said single electrical circuit board in said casing member so that said first and second electrical contact means cooperates with the first and second potentiometer circuits thereon.

10. A mirror assembly as defined in claim 9 wherein said casing member includes an exterior edge portion spaced alongside said circuit board having a plurality of closely spaced notches therein and a plurality of electrical wires connected with the first and second potentiometer circuits of said circuit board and extending therefrom within said plurality of notches, said support member having a cooperating exterior edge portion retaining said wires in said notches.

11. A mirror assembly as defined in claim 10 wherein said power operated means includes first and second electric motors mounted within said casing assembly and having a plurality of electrical motor wires connected therewith, said plurality of motor wires extending within a second plurality of notches in said exterior edge portion of said casing member and retained therein by the cooperating exterior edge portion of said support member.

12. A mirror assembly as defined in claim 11 wherein each of said first and second integral mounting structures comprises an upstanding integral wall of generally C-shaped cross-sectional configuration within which a truncated spherical bulge on the opposite end of the associated sensing member is slidably mounted.

13. A mirror assembly as defined in claim 12 wherein the C-shaped wall mounting said first sensing member opens to one side of said circuit board and the C-shaped wall mounting said second sensing member opens to the opposite side of said circuit board.

14. A mirror assembly as defined in claim 1 wherein said connecting means is further operable to prevent pivotal movements between said members about a third axis perpendicular to and intersecting said two intersecting axes, a casing member fixed to said support member and forming therewith a casing assembly, said casing assembly having power operated means mounted therein for effecting pivotal movements of said mirror holding member about said two intersecting perpendicular axes, said power operated means including a pair of power driven actuator assemblies, each of said actuator assemblies including a first actuator member having an end portion extending outwardly of said casing assembly pivotally connected to said mirror holding member and a second actuator member disposed in telescoping relation with said first actuator member along a longitudinally extending telescoping axis, each second actuator member having an integral connecting structure on one end thereof, said casing member having an integral connecting structure thereon having a snap-in relationship with respect to the integral connecting structure on each second actuator member operable when in said snap-in relationship to (1) permit rotational movements about the telescoping axis thereof and pivotal movements about a centerpoint on the telescoping axis thereof and (2) prevent movements in either direction along the telescoping axis thereof, each actuator assembly also including a hollow pinion member disposed in surrounding relation to the associated second actuator member and mounted in said casing member for power driven rotation about a fixed axis, integral means on each pinion member and the associated second actuator member for transmitting rotational movements of the pinion member to corresponding rotational movements of the associated second actuator member about the telescoping axis thereof while accommodating pivotal movements of the associated second actuator member about the center point thereof, the pivotal mounting of each first actuator member being such as to prevent rotational movements thereof about the telescoping axis thereof, and yieldable threaded means between the first and second actuator members of each actuator assembly for effecting telescopic movements of the associated first actuator member along the telescoping axis thereof with respect to the associated second actuator member in response to rotational movements of the associated second actuator member about the telescoping axis thereof.

15. A mirror assembly as defined in claim 14 wherein said integral means on each second actuator member comprises a plurality of annularly spaced notches in an exterior periphery of said disk portion and said integral means on each pinion member comprises a plurality of depending lugs on a low edge thereof fitted with said plurality of notches.

16. A mirror assembly as defined in claim 15 wherein each second actuator member includes a disk shaped portion, the integral connecting structure of each second actuator member comprising a ball portion integral with one side of the associated disk shaped portion in concentric relation therewith, each disk shaped portion having a cylindrical wall portion integral with the other side thereof in concentric relation therewith, said threaded means including exterior threads on an exterior periphery of each cylindrical wall portion.

17. A mirror assembly as defined in claim 16 wherein each first actuator member includes a shaft portion slidably telescopically mounted within the interior periphery of the cylindrical wall member of the associated second actuator member, a plurality of integral annularly spaced longitudinally extending arm portions disposed in radially outwardly spaced relation with respect to said shaft portion, said arm portions having inturned free ends, said threaded means including internal threads formed on said inturned ends threadedly engaging the exterior threads on the cylindrical wall portion of the associated second actuator member.

18. A mirror assembly as defined in claim 14 wherein said mirror holding member has first and second sensing members connected therewith so that said first sensing member moves therewith only when said mirror holding member moves about one of said two intersecting axes and said second sensing member moves therewith only when said mirror holding member moves about the other of said two intersecting axes, said casing member having spaced first and second integral structures for mounting opposite end portions of said first and second sensing members for generally longitudinal movements corresponding to the movements of the ends thereof with said mirror holding member, a single electrical circuit board having first and second potentiometer circuits thereon, first and second electrical contact means carried by the opposite end portions of said first and second sensing members respectively for movements therewith, and means for mounting said single electrical circuit board in said casing member so that said first and second electrical contact means cooperates with the first and second potentiometer circuits thereon.

19. A mirror assembly comprising
a mirror holding member,
a mirror carried by said mirror holding member,
a support member,
means for connecting said mirror holding member on said support member for pivotal movements along two intersecting perpendicular axes and for substantially preventing pivotal movements about a third intersecting perpendicular axis,
a casing member fixed to said support member and forming therewith a casing assembly,
said casing assembly having power operated means mounted therein for effecting pivotal movements of said mirror holding member about said two intersecting perpendicular axis,
said power operated means including a pair of power driven actuator assemblies,
each actuator assembly including a member connected to said mirror holding member and a member connected to said casing member,
at least one connection between one member of each actuator assembly and the member to which it is connected comprising cooperating first and second connecting structures formed integrally on the members of said one connection,
said first integral connecting structure comprising a projecting base portion having an enlarged portion on a projecting end of said base portion, said enlarged portion having first convex connecting surface means disposed within a first spherical plane having a first pair of parallel truncations one of which is defined by an intersection with said base portion,
said enlarged portion having first concave connecting surface means facing away from said base portion disposed within a first spherical segmental plane having (1) a center coincident with the center of said first truncated spherical plane and (2) a radius smaller than the radius of aforesaid first truncated spherical plane,
said second integral connecting structure comprising a projecting annular wall having second concave connecting surface means disposed within a second spherical plane having (1) a radius generally equal to the radius of said first truncated spherical plane and (2) a second pair of parallel truncations,
said second integral connecting structure including a projecting central portion within said annular wall having second convex connecting surface means facing in the direction of projection of said annular wall disposed within a second spherical segmental plane having (1) a center coincident with the center of said second truncated spherical plane and (2) a radius equal to the radius of said first spherical segmental plane,
the nature of the plastic material and the construction of said annular wall being such that said annular wall is operable in response to the movement of said enlarged portion therein to resiliently yield and resiliently return to bring the first convex connecting surface means of said enlarged portion into engagement with the second concave connecting surface means of said annular wall and said first concave connecting surface means of said enlarged portion into engagement with the second convex connecting surface means of said projecting central portion, the engagement of said connecting surface means permitting relative sliding movement therebetween so as to retain the members of said one connection in cooperating relation in a multiplicity of different positions of pivotal movement.

20. A mirror assembly as defined in claim 19 wherein said first concave connecting surface means comprises a first spherical segmental surface extending throughout said first spherical segmental plane, said first convex connecting surface means includes a first dual truncated spherical surface extending throughout said first spherical plane between the first pair of truncations thereof, said first concave connecting surface means comprises a first spherical segmental surface extending throughout said first spherical segmental plane, said first integral connecting structure including an annular surface extending from said first spherical segmental surface to said first dual truncated spherical surface in outward diverging relation.

21. A mirror assembly as defined in claim 20 wherein said projecting central portion is in the form of a cone having said second convex connecting surface means on the apex thereof, said second convex connecting surface means comprising a second spherical segmental surface extending throughout said second spherical segmental plane.

22. A mirror assembly as defined in claim 21 wherein the angle of divergence of said cone is substantially less than the angle of divergence of said outwardly diverging annular surface.

23. A mirror assembly comprising
a mirror holding member,
a mirror holding member,
a mirror carried by said mirror holding member,
a support member,
means for connecting said mirror holding member on said support member for pivotal movements along two intersecting perpendicular axes and for substantially preventing pivotal movements about a third intersecting perpendicular axis,
a casing member fixed to said support member and forming therewith a casing assembly,
said casing assembly having power operated means mounted therein for effecting pivotal movements of said mirror holding member about said two intersecting perpendicular axes, said power operated means including a pair of power driven actuator assemblies, each of said actuator assemblies including a first actuator member having an end portion extending outwardly of said casing assembly pivotally connected to said mirror holding member and a second actuator member disposed in telescoping relation with said first actuator member along a longitudinally extending telescoping axis, each second actuator member having an integral connecting structure on one end thereof, said casing member having an integral connecting structure thereon having a snap-in relationship with respect to the integral connecting structure on each second actuator member operable when in said snap-in relationship to (1) permit rotational movements about the telescoping axis thereof and pivotal movements about a centerpoint on the telescoping axis thereof and (2) prevent movements in either direction along the telescoping axis thereof, each actuator assembly also including a hollow pinion member disposed in surrounding relation to the associated second actuator member and mounted in said casing member for power driven rotation about a fixed axis, integral means on each pinion member and the associated second actuator member for transmitting rotational movements of the pinion member to corresponding rotational movements of the associated second actuator member about the telescoping axis thereof while accommodating pivotal movements of the associated second actuator member about the center point thereof, the pivotal mounting of each first actuator member being such as to prevent rotational movements thereof about the telescoping axis thereof, and yieldable threaded means between the first and second actuator members of each actuator assembly for effecting telescopic movements of the associated first actuator member along the telescoping axis thereof with respect to the associated second actuator member in response to rotational movements of the associated second actuator member about the telescoping axis thereof.

24. A mirror assembly as defined in claim 23 wherein said integral means on each second actuator member comprises a plurality of annularly spaced notches in an exterior periphery of said disk portion and said integral means on each pinion member comprises a plurality of depending lugs on a low edge thereof fitted with said plurality of notches.

25. A mirror assembly as defined in claim 24 wherein each second actuator member includes a disk shaped portion, the integral connecting structure of each second actuator member comprising a ball portion integral with one side of the associated disk shaped portion in concentric relation therewith, each disk shaped portion having a cylindrical wall portion integral with the other side thereof in concentric relation therewith, said threaded means including exterior threads on an exterior periphery of each cylindrical wall portion.

26. A mirror assembly as defined in claim 25 wherein each first actuator member includes a shaft portion slidably telescopically mounted within the interior periphery of the cylindrical wall member of the associated second actuator member, a plurality of integral annularly spaced longitudinally extending arm portions disposed in radially outwardly spaced relation with respect to said shaft portion, said arm portions having inturned free ends, said threaded means including internal threads formed on said inturned ends threadedly engaging the exterior threads on the cylindrical wall portion of the associated second actuator member.

27. A mirror assembly as defined in claim 23 wherein said mirror holding member has first and second sensing members connected therewith so that said first sensing member moves therewith only when said mirror holding member moves about one of said two intersecting axes and said second sensing member moves therewith only when said mirror holding member moves about the other of said two intersecting axes, said casing member having spaced first and second integral structures for mounting opposite end portions of said first and second sensing members for generally longitudinal movements corresponding to the movements of the ends thereof with said mirror holding member, a single electrical circuit board having first and second potentiometer circuits thereon, first and second electrical contact means carried by the opposite end portions of said first and second sensing members respectively for movements therewith, and means for mounting said single electrical circuit board in said casing member so that said first and second electrical contact means cooperate with the first and second potentiometer circuits thereon.

28. A mirror assembly comprising a mirror holding member, a mirror carried by said mirror holding member, a support member, means for connecting said mirror holding member on said support member for pivotal movements along two intersecting perpendicular axes and for substantially preventing pivotal movements about a third intersecting perpendicular axis, a casing member fixed to said support member and forming therewith a casing assembly, said casing assembly having power operated means mounted therein for effecting pivotal movements of said mirror holding member about said two intersecting perpendicular axes, first and second sensing members having ends connected with said mirror holding member so that said first sensing member moves therewith only when said mirror holding member moves about one of said two intersecting axes and said second sensing member moves therewith only when said mirror holding member moves about the other of said two intersecting axes, said casing member having spaced first and second integral structures for mounting opposite end portions of said first and second sensing members for generally longitudinal movements corresponding to the movements of the ends thereof with said mirror holding member, a single electrical circuit board having first and second potentiometer circuits thereon, first and second electrical contact means carried by the opposite end portions of said first and second sensing members respectively for movements therewith, and means for mounting said single electrical circuit board in said casing member so that said first and second electrical contact means cooperate with the first and second potentiometer circuits thereon.

29. A mirror assembly as defined in claim 28 wherein said casing member includes an exterior edge portion spaced alongside said circuit board having a plurality of closely spaced notches therein and a plurality of electrical wires connected with the first and second potentiometer circuits of said circuit board and extending therefrom within said plurality of notches, said support member having a cooperating exterior edge portion retaining said wires in said notches.

30. A mirror assembly as defined in claim 29 wherein said power operated means includes first and second electric motors mounted within said casing assembly and having a plurality of electrical motor wires connected therewith, said plurality of motor wires extending within a second plurality of notches in said exterior edge portion of said casing member and retained therein by the cooperating exterior edge portion of said support member.

31. A mirror assembly as defined in claim 30 wherein each of said first and second integral mounting structures comprises an upstanding integral wall of generally C-shaped cross-sectional configuration within which a truncated spherical bulge on the opposite end of the associated sensing member is slidably mounted.

32. A mirror assembly as defined in claim 28 wherein the C-shaped wall mounting said first sensing member opens to one side of said circuit board and the C-shaped wall mounting said second sensing member opens to the opposite side of said circuit board.

* * * * *